Patented May 5, 1931

1,804,201

UNITED STATES PATENT OFFICE

EARL H. BUNCE AND GEORGE T. MAHLER, OF PALMERTON, PENNSYLVANIA, ASSIGNORS TO THE NEW JERSEY ZINC COMPANY, OF NEW YORK, N. Y., A CORPORATION OF NEW JERSEY

REDUCING ZINCIFEROUS MATERIAL

No Drawing.   Application filed July 13, 1927. Serial No. 205,527.

This invention relates to the smelting or reduction of zinciferous materials and has for its object the provision of an improved method of reducing zinc ores and other zinc-bearing materials.

In the heretofore customary methods of zinc smelting, both for the production of zinc metal or spelter as well as for the production of zinc oxide, the zinciferous material is intimately mixed with carbonaceous reducing agent. Indeed, many prominent zinc metallurgists have maintained that oxidized or roasted zinc ores could not be successfully smelted without the so-called "carbon contact" that results from the intimate mixture of the ore and coal or other carbonaceous reducing agent. While the intimate mixture of zinc ore and carbonaceous reducing agent is of unquestionable benefit in the smelting operation, it is not a necessary condition, since gaseous reducing agents, such as carbon monoxide, will reduce the zinc compounds (usually zinc oxide, zinc silicate and the like) present in the ore.

Our present invention is principally characterized by the fact that the zinciferous and carbonaceous materials of the smelting charge are not intimately mixed. On the contrary, the charge is made up of mixed agglomerates of zinc ore and agglomerates of carbonaceous material. The zinc ore may be agglomerated in any appropriate manner, as for example by briquetting, or extrusion, but our preferred practice is to effect the agglomeration by sintering the ore. Similarly, the carbonaceous material may be agglomerated by briquetting or in any other suitable manner, but our preferred practice is to coke or cake the carbonaceous material using for this purpose a caking or coking coal. The agglomerates of zinc ore and the agglomerates of carbonaceous material are then preferably mixed in appropriate proportions and introduced into a reducing chamber operated under the conditions hereinafter described.

The successful smelting of a charge of mixed agglomerates of zinc ore and agglomerates of carbonaceous material depends upon the maintenance throughout the charge of a current of moving gases. To this end, the charge should have a certain porosity and the reducing chamber should have such characteristics that gases evolved within or introduced into the porous charge will establish and maintain such a current of gas flow throughout the entire body of the charge as will insure substantially complete reduction of the compounds of zinc in the ore agglomerates by the reducing gases present. The required porosity of the charge is obtained by agglomerating the zinc ore and the carbonaceous material. When introduced into the reducing chamber, the voids or spaces between the individual agglomerates provide passages or channels that permit a flow of gas through the entire body of the charge. While the required flow of gas through the charge may be established and maintained in various ways, it is most conveniently and effectively accomplished by carrying out the reduction in an upright or vertically disposed reducing chamber, such, for example, as an externally heated vertical retort. However, horizontal reducing chambers may be employed. A furnace of the horizontal type, which is peculiarly adapted for the practice of this invention, is described in a copending application, Serial No. 184,886, filed April 19, 1927, of which one of us was a co-inventor. In the use of this furnace the agglomerates are fed into the reduction chamber directly from the agglomerate forming machine. A traveling or moving grate is employed to transport the agglomerates through the reduction zone. Any other suitable horizontal furnace would, however, be adequate in which to practice the present invention.

Our present preferred practice is to smelt a charge of mixed agglomerates of zinc ore and agglomerates of carbonaceous material in an upright or vertically disposed reducing chamber. The reducing chamber is preferably externally heated by any appropriate heating means susceptible of convenient regulation and control for establishing and maintaining the desired operating temperature within the chamber. Furthermore, the chamber is of such length or height as to induce by its stack draft effect the required flow of gas through the porous agglomerated charge. For this purpose the reducing chamber should be at least fifteen feet high, and may advantageously be very considerably higher.

The zinc ore, or other zinciferous material, is finely divided as in the present zinc smelting practices and is then formed into agglomerates of suitable size for the subsequent smelting operation. In accordance with our preferred practice, the zinc ore is sintered by any of the well known sintering processes. Thus, for example, the zinc ore may be treated on a Dwight-Lloyd or other suitable sintering machine. In the treatment of zinc sulfide ores, the agglomeration or sintering may be effected by a blast roasting operation following a partial desulfurizing operation. Where the zinc ore does not itself contain sinter-forming constituents, such constituents (i. e., coal, lime, sand, etc.) may be mixed with the ore to promote sintering with the formation of agglomerates.

Metallurgical coke may be used as the agglomerates of carbonaceous material. Agglomerates of anthracite coal may also be used. We prefer, however, to employ agglomerates made by caking or coking appropriate coals at relatively low temperatures. This caking or coking operation may conveniently be carried out in vertical retorts at temperatures not exceeding about 950° C. The caked or coked coal formed at these relatively low temperatures appears more active in the reduction operation and as a consequence thereof the smelting or reduction of the zinc ore is materially promoted.

The reducing or smelting operation is further promoted by charging the agglomerates of ore and coal into the reducing chamber at a temperature approximating that of the reducing chamber. This may be accomplished, if desired, by preheating both the ore agglomerates and the coal agglomerates. We prefer, however, to synchronize the agglomerating operations with the smelting operation so that the agglomerates may be transferred without substantial loss of heat from the agglomerating apparatus to the reducing chamber. Thus, where the zinc ore is sintered and the coal is caked or coked at relatively low temperature, we prefer to introduce the hot sinter and the hot caked or coked coal, in appropriate relative proportions, direct from their respective sintering and caking apparatus into the reducing chamber with as little loss of heat as practicable.

The ore agglomerates and the coal agglomerates are introduced into the reducing chamber in such manner as to effect a uniform distribution of the two kinds of agglomerates. While this desired distribution is better assured by mixing the agglomerates prior to their introduction into the reducing chamber, this is not necessary. In practice, it is satisfactory to introduce into the reducing chamber alternate charges of ore agglomerates and coal agglomerates in such predetermined small relative amounts as to secure satisfactory distribution thereof in the chamber. Indeed, satisfactory results may be obtained by charging separate layers of appropriate depth of ore agglomerates and coal agglomerates.

When smelting an agglomerated charge of zinciferous and reducing materials in an upright or vertically disposed reducing chamber, it has been found that the bottom or residue discharge outlet of the chamber need not be mechanically sealed. By maintaining an appropriate gas pressure near the bottom of the chamber, the residue discharge outlet may be so controlled as to inhibit the entrance of gas or to induce the entrance of a reduction promoting gas. In the practice of our present invention, we so regulate the gas pressure at or near the bottom of the reducing chamber that a small controlled amount of air is sucked or drawn into the reducing chamber by its stack draft effect. The oxygen in this air is promptly converted into carbon monoxide gas by reaction with the unconsumed carbon in the hot coal agglomerates near the bottom of the reducing chamber, and passing upwardly through the charge this carbon monoxide gas contributes towards the reduction of zinc compounds in the ore agglomerates.

In the smelting of a porous charge of agglomerates in an upright or vertically disposed and externally heated reducing chamber, heat in large quantity is transferred from the heated wall or walls of the chamber to the center or core of the agglomerated charge by currents of hot gases flowing through the voids or spaces between the agglomerates. For the most part, these gases are evolved within the charge in the course of the reducing reaction, but, in the practice of our present invention, these gases are further augmented by the air drawn into the bottom of the reducing chamber. We therefore have a large volume of hot gases, in which carbon monoxide is present in large quantity, flowing through the porous agglomerated charge, and in consequence thereof the ore agglomerates are promptly heated to the necesssary temperature to effect the reduction of the compounds of zinc therein by carbon monoxide gas. Such carbon dioxide gas as is formed in the reduction of the zinc compounds by carbon monoxide gas is promptly again reduced to carbon monoxide by contact with the hot coal agglomerates. Thus, a completely reducing atmosphere is at all times maintained within the reducing chamber and effective contact is assured between the zinc compounds to be reduced and the reducing gases.

The velocity of the reduction within the reducing chamber may advantageously be speeded up by introducing appropriate gases in controlled amounts. In the case of vertical or upright retorts this may be done by entering the gases at the bottom. In the case of horizontal retorts, particularly of the traveling grate type, the gases may be entered at or near the residue or discharge outlet. To this end, it is particularly advantageous, where employing coke agglomerates, to conduct the coking operation in proximity to the reducing apparatus, and to introduce the coking gases into the reducing chamber at one or more appropriate points. Crude, fuel or other suitable oil may be introduced into the reducing chamber for producing the desired additional reducing gases.

For the optimum results, the ore agglomerates should be readily pervious to the passage of gas therein. While even a compact briquet of ore possesses such perviousness in large degree, the sintered agglomerate is relatively much more pervious. The hot sintered agglomerate is readily permeated by the hot reducing gases and effective reduction of the zinc compounds takes place.

The size of the agglomerates will depend to some extent on the dimensions of the reducing chamber. The agglomerates should be sufficiently small to provide enough voids or spaces between the agglomerates to give the charge as a whole that degree of porosity required for the ready flow of the heat-carrying gases. In practice, the agglomerates may vary in thickness from about three to nine inches. While we prefer that the agglomerates be approximately uniform in size, this is not essential, and agglomerates varying considerably in size may be charged into the reducing chamber, when desired or necessary for practical considerations.

The metallic zinc vapor resulting from the reduction of the zinciferous material is appropriately withdrawn from the reducing chamber along with the other gases of the reducing operation. These withdrawn gases may be passed through a zinc condenser where the metallic zinc vapor is condensed to zinc metal and thus recovered. If desired, the metallic zinc vapor may be oxidized or burned to form zinc oxide, or it may be passed through a canister and condensed to zinc dust or blue powder.

We claim:

The method of reducing zinciferous material which comprises heating a porous charge composed of agglomerates of zinciferous material and agglomerates of carbonaceous material in a reducing chamber to a sufficiently high temperature to reduce compounds of zinc, maintaining throughout the porous charge of agglomerates a flow of hot gases containing carbon monoxide, said carbon monoxide being formed in part at least by permitting controlled amounts of air to seep into the heated charge, and withdrawing from the reducing chamber a gaseous product containing metallic zinc vapor.

In testimony whereof we affix our signatures.

EARL H. BUNCE.
GEORGE T. MAHLER.